United States Patent

Saib

Patent Number: 6,049,830
Date of Patent: Apr. 11, 2000

[54] PERIPHERAL SOFTWARE DOWNLOAD OF A BROADCAST RECEIVER

[75] Inventor: Joseph Saib, San Diego, Calif.

[73] Assignees: Sony Corporation, Tokyo, Japan; Sony Electronics, Inc., Park Ridge, N.J.

[21] Appl. No.: 08/855,060

[22] Filed: May 13, 1997

[51] Int. Cl.[7] ........................................................ H04L 5/00
[52] U.S. Cl. ................................. 709/231; 348/180
[58] Field of Search .................................. 348/6, 10, 112, 348/7, 8, 9, 569, 552, 461, 465, 467, 180; 455/3.2, 63; 370/477; 345/327; 709/231, 208; 395/550; 380/5

[56] References Cited

U.S. PATENT DOCUMENTS

| 5,559,999 | 9/1996 | Maturi et al. | 395/550 |
|---|---|---|---|
| 5,619,274 | 4/1997 | Roop et al. | 348/461 |
| 5,659,539 | 8/1997 | Porter et al. | 709/231 |
| 5,666,293 | 9/1997 | Metz et al. | 709/208 |
| 5,764,658 | 6/1998 | Sekiguchi et al. | 371/37.1 |
| 5,805,155 | 9/1998 | Allibhoy et al. | 345/327 |
| 5,805,204 | 9/1998 | Thompson et al. | 348/13 |
| 5,808,694 | 9/1998 | Usui et al. | 348/569 |
| 5,822,425 | 10/1998 | Ezaki et al. | 380/5 |
| 5,838,314 | 11/1998 | Neel et al. | 345/327 |
| 5,886,995 | 3/1999 | Arsenault et al. | 370/477 |
| 5,892,535 | 4/1999 | Allen et al. | 348/9 |
| 5,936,667 | 8/1999 | Saib et al. | 348/180 |

FOREIGN PATENT DOCUMENTS

| 9613932 | 5/1996 | WIPO | H04N 5/76 |
|---|---|---|---|
| 9633491 | 10/1996 | WIPO | H04N 7/025 |
| 9730549 | 8/1997 | WIPO | H04N 7/10 |

*Primary Examiner*—Frank J. Asta
*Assistant Examiner*—Thong Vu
*Attorney, Agent, or Firm*—Blakely, Sokoloff, Taylor & Zafman LLP

[57] ABSTRACT

A system and method for downloading update data to a targeted peripheral device connected to a broadcast receiver such as an integrated receiver decoder (IRD). The update data is received via a broadcast transmission. The system features one or more peripheral devices interconnected to the IRD. The IRD receives a broadcast digital bit stream and processes contents of its header information if it is targeted for the IRD. Next, the IRD determines whether the digital bit stream includes update data to be downloaded and which peripheral device is targeted to receive the update data. Thereafter, the IRD causes the update data to be loaded into the targeted peripheral device.

22 Claims, 4 Drawing Sheets

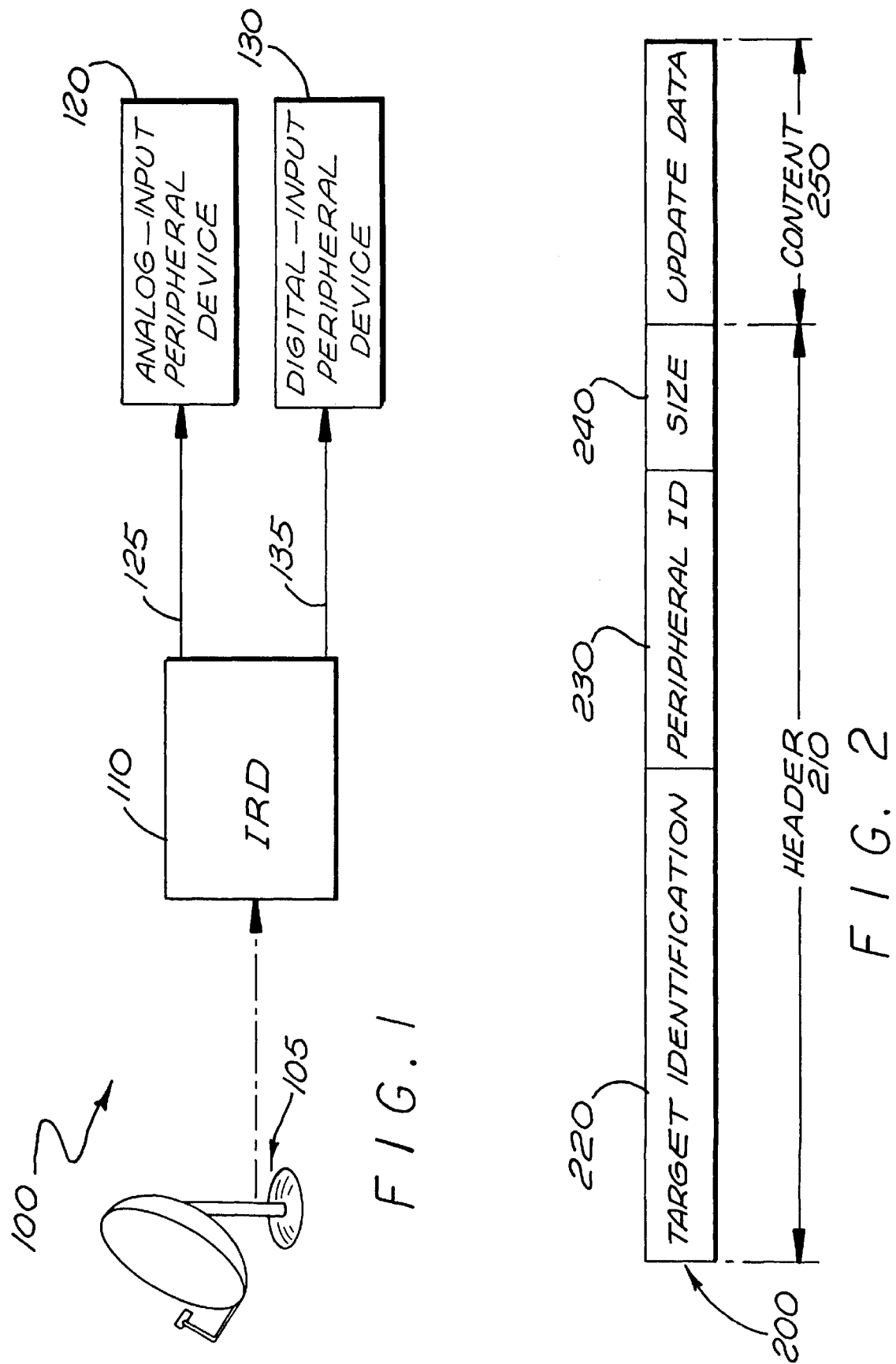

PERIPHERAL SOFTWARE DOWNLOAD OF A BROADCAST RECEIVER

BACKGROUND OF THE INVENTION

1. Field of the Invention

The present invention relates to the field of information systems. More particularly, the present invention relates to a system and method for updating stored information contained within a peripheral device connected to a broadcast receiver.

2. Description of Art Related to the Invention

Over the last few years, there has been a growing demand for entertainment systems working in conjunction with various types of broadcasting systems. An example of the entertainment system includes a digital satellite system (DSS). The DSS includes an antenna that receives a digital bit stream from DSS satellites and routes the bit stream to an integrated receiver decoder (IRD). The IRD is responsible for decoding the bit stream and processing the decoded bit stream to produce one or more output signals. These output signals are sent to one or more peripheral devices. For example, one output signal may be sent to an analog-input peripheral device (e.g., television receiver or an analog recorder "VCR"). Another output signal may be sent to another analog-input peripheral device or a digital-input peripheral device (e.g., a remote transmitter).

One disadvantage associated with conventional entertainment systems is that these systems are not configured to fully utilize their broadcast capability. More specifically, a conventional entertainment system is unable to provide update data to one or more peripheral devices. "Update data" includes software programs or any other data to be substituted for stored data contained in the peripheral device(s). For example, the update data may include a software patch to fix minor bugs in software pre-loaded into a peripheral device. This could be used to possibly avoid costly recalls of peripheral devices. Additionally, update data may include control codes to be loaded into a remote transmitter. This would allow the remote transmitter to identify and support a peripheral device connected after installation and setup of the IRD.

SUMMARY OF THE INVENTION

The present invention relates to a system and method for downloading update data to a peripheral device connected to a broadcast receiver such as an integrated receiver decoder (IRD). The update data is contained in a broadcast digital bit stream. The IRD receives the broadcast digital bit stream and processes header information contained therein to initially determine whether the digital bit stream is directed to the IRD. If so, the IRD determines whether the bit stream includes update data to be downloaded and whether the peripheral device is targeted to receive the update data. Thereafter, if connected to the IRD and targeted to receive the update data, the peripheral device receives the update data in a format recognized by the peripheral device.

BRIEF DESCRIPTION OF THE DRAWINGS

The features and advantages of the present invention will become apparent from the following detailed description in combination with the figures listed below.

FIG. 1 is an illustrative embodiment of an entertainment system operating in accordance with the present invention.

FIG. 2 is a representation of a data packet structure utilized by the integrated receiver decoder supporting the broadcast of data updates.

DESCRIPTION OF THE PREFERRED EMBODIMENT

Figure 3:
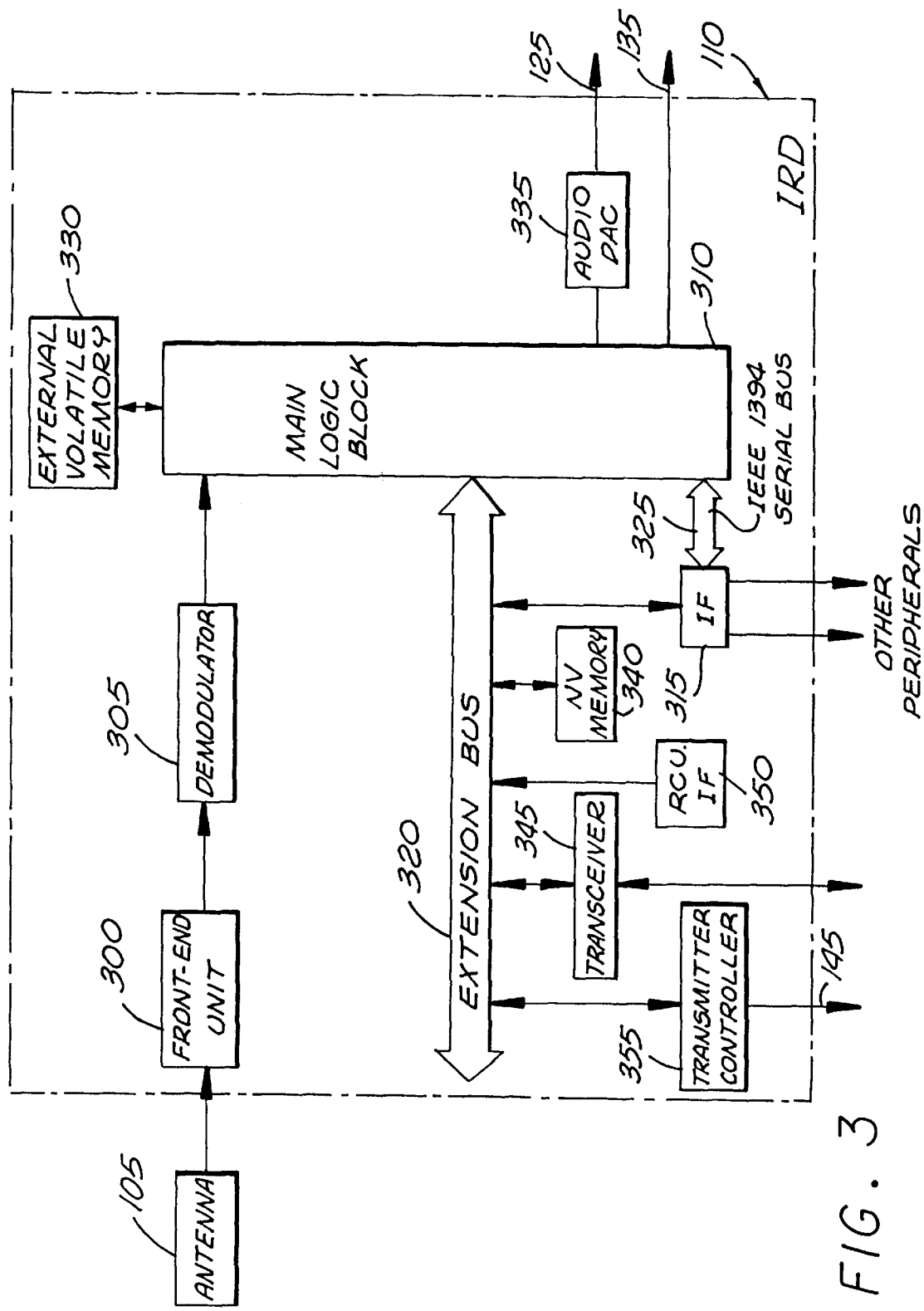
FIG. 3 is a more detailed block diagram featuring one embodiment of an integrated receiver decoder implemented within the entertainment system of FIG. 1.

In its preferred embodiment, the present invention relates a system and method for updating stored memory of a peripheral device, interconnected to a broadcast receiver, through a broadcast mechanism. Of course, the invention may be applicable for use with many types of broadcast receivers such as an integrated receiver decoder, a cable box for a Cable Broadcasting System and the like. While certain illustrative embodiments are set forth to describe the invention, such embodiments should not be construed as a limitation on the scope of the present invention.

Herein, various terms are used to describe certain elements or characteristics of the present invention. For example, a "communication line" is broadly defined as any communication path between a source and a destination. The communication line may include one or more information-carrying lines (electrical wire, fiber optic, etc.) or wireless communications through established techniques such as infrared (IR) and radio frequency (RF) signaling. Update data is defined as one or more bits of data. This data may include software, control code used to identify a peripheral device for control purposes and the like.

Referring to FIG. 1, a first embodiment of an entertainment system utilizing the present invention is shown. The entertainment system 100 comprises an antenna 105, a broadcast receiver 110 such as an integrated receiver decoder (IRD) for example, and one or more peripheral devices. The broadcast receiver, in general, receives a broadcast signal (a digital bit stream for example) and performs operations on the broadcast signal to produce digital and/or analog information. However, for this embodiment, IRD is implemented as the broadcast receiver.

As shown, the peripheral devices include at least one analog-input peripheral device 120, and/or at least one digital-input peripheral device 130. The analog-input peripheral device 120 may include, but is not limited or restricted to a standard television receiver (TV), and/or a standard video cassette recorder (VCR). The digital-input peripheral device 130 may include, but is not limited or restricted to, a digital TV, digital VCR, a digital video disk (DVD) player, a compact disc player, a mass storage device such as an external hard disk drive, or a remote transmitter such as a SONY® VCR MOUSE™ manufactured by Matsushita Corporation of Osaka, Japan. These peripheral devices 120 and/or 130, if implemented, are connected to IRD 110.

Antenna 105 receives the digital bit stream from an orbiting satellite (not shown). In this embodiment, the bit stream is a plurality of data packets including one or more data packets that contain update data. The data packet(s) is (are) formatted in accordance with a selected data packet structure (see FIG. 2) and possibly encrypted under either a symmetric key cryptographic function or a public-key cryptographic function. Antenna 105 transfers the bit stream to IRD 110.

IRD 110 includes circuitry that can support analog-input peripheral devices, digital-input peripheral devices, or a combination of these peripheral device types. For example, as shown, IRD 110 is capable of processing the bit stream into output data having an analog format recognized by a particular analog-input peripheral device 120. The output data is transferred over communication line 125. The analog format may be in accordance with a video format established by National Television Systems Committee (NTSC), or perhaps other video formats, including but is not limited to Phase Alternating Line (PAL), Sequential Couleur avec Memoire (SECAM) and other recognized formats. Similarly, IRD 110 may be easily configured to process the bit stream into digital data recognized by a particular digital-input peripheral device 130 as described below. The digital data is transferred over a unidirectional communication line 135.

Referring now to FIG. 2, an embodiment of the data structure of one or more data packets of the digital bit stream is shown. The bit stream is broadcast from an orbiting satellite and used to provide update data to a peripheral device. The data packet 200 includes a header portion 210 and a content portion 250. The header portion 210 may include, but is not limited or restricted to a target identification (ID) field 220, a peripheral ID field 230, and a size field 240. The content portion 250 contains the update data. In the event that the size of the update data exceeds the size of a single data packet, it is contemplated that subsequent data packets containing the remaining update data may include the header portion 210 with appropriate padding, as necessary, to ensure that the last data packet does not contain erroneous data.

The target ID field 220 includes a digital bit pattern that indicates which IRD(s) is (are) to process an incoming bit stream. The digital bit pattern can be configured to request a single IRD (e.g., IRD 110) or a group of IRDs. By assigning a particular bit pattern for a group of IRDs, multiple broadcasts of identical information may be avoided. This grouping could be performed based on the type and/or manufacturer of the IRD, geographic location of the IRD, selected DSS service packages purchased, and the like. The bit size of the target ID field 220 is selected based on the number of IRDs and possible groupings of IRDs capable of receiving broadcast data.

To perform the above-identified operations, the target ID field 220 may further include a number of sub-fields. These sub-fields may include one or more bits providing information about one or more of the following: (i) whether or not there is update data to be downloaded; (ii) manufacturer of the IRD; (iii) a sequence number of a multiple data packet, transmission to support out-of-order data packet transmission, and the like.

The peripheral ID field 230 includes a bit pattern that indicates which peripheral device is to receive the update data. Of course, each type of peripheral device capable of being coupled to an IRD would need to be assigned a unique bit pattern. For example, a SONY® TV could be assigned a first bit pattern, a SONY® VCR could be assigned a second bit pattern, a competitor's TV could be assigned a third bit pattern, and the like.

The size field 240 indicates the size of the update data contained in the content portion 250. Each binary value may be used to reflect a chosen size unit (e.g., bit, nibble, byte, word, double word, block, etc.). The size field 240 further provides information to check whether the entire update data has been received.

Referring now to FIG. 3, an illustrative embodiment of IRD 110 is shown. Antenna 105 transfers the bit stream to a front-end unit 300 of IRD 110. Although not shown, front-end unit 300 includes (i) amplification circuitry used to amplify any relatively weak signals received at antenna 105 and (ii) a tuner which allows a user to "tune" to a desired channel. For example, data packet(s), including update data, may be broadcast through all supported channels or through only one selected channel in which all other channels receive a packet including a command to cause IRD to tune to the selected channel.

For the case where the digital satellite system service provider wishes to broadcast update data to IRD 110, the bit stream associated with the desired channel is routed from front-end unit 300 to a demodulator 305. In demodulator 305, the bit stream is initially processed before transferring to a main logic block 310 for further processing. Such initial processing may include exposing the bit stream to demodulation and decoding functions such as QPSK-demodulation, viterbi-decoding, de-interleaving and Reed-Solomon decoding.

In some cases, IRD 110 is connected to peripheral devices (e.g., digital-input peripheral devices) though an interface (IF) 315. In this embodiment, IF 315 may include a link layer integrated circuit (IC) and a physical layer IC (not shown) and complies with an Institute of Electronic and Electrical Engineers (IEEE) standards document 1394 entitled "Standard for High Performance Serial Bus" (hereinafter referred to as "IEEE 1394"). The digital-input peripheral device supplies control signals (e.g., IEEE 1394 commands) to a central processing unit (CPU) within main logic block 310 (see FIG. 4) through IF 315 and extension bus 320 or alternatively IEEE 1394 serial bus 325. Similarly, update data is transferred between peripheral devices and main logic block 310 through IF 315 via extension bus 320 or IEEE 1394 serial bus 325.

Figure 4:
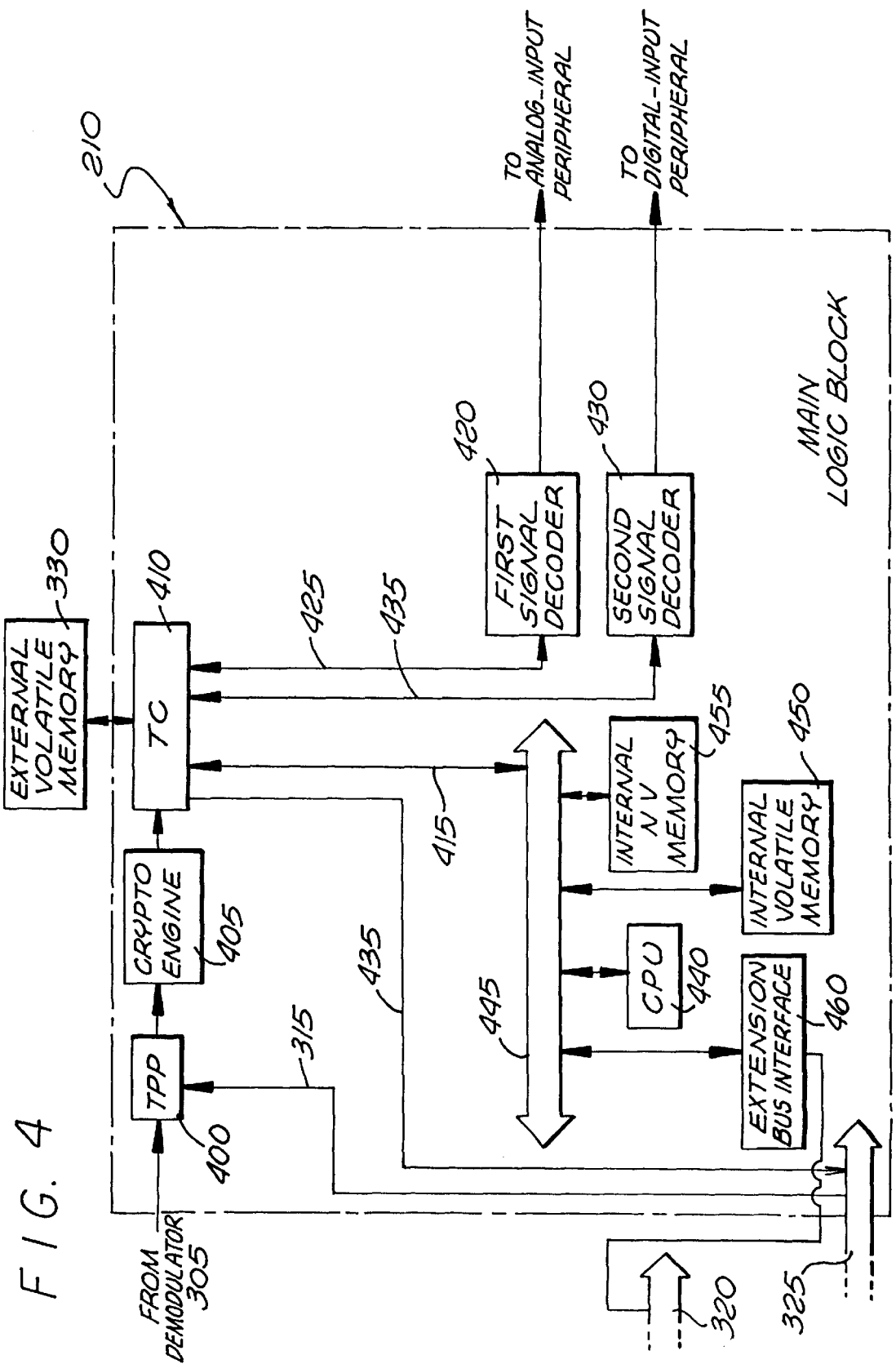
FIG. 4 is a more detailed block diagram featuring one embodiment of a main logic block of the integrated receiver decoder of FIG. 2.

Referring now to FIG. 4, the electronic circuitry of the main logic block 310 is shown. The Transport Packet Parser (TPP) 400 receives the decoded bit stream and performs a parsing operation in order to separate information having different characteristics (video, audio, control). With the bit stream containing only control, namely update data, the parsed bit stream is decrypted by a cryptographic engine 405 which may operate in accordance with a cryptographic function, for example Data Encryption Standard (DES). Thereafter, the decrypted bit stream, absent the data contained in the identification field, is stored in an external volatile memory 330 (e.g., random access memory "RAM") under the control of traffic controller (TC) 410.

In response to a control signal from CPU 440 via communication line 415, traffic controller 410 retrieves at least portions of the stored decrypted bit stream from external volatile memory 330. Thereafter, traffic controller 410 determines the intended peripheral device from the contents of the peripheral ID field and distributes the update data through one of a number of communication paths. For example, update data may be transferred to a first signal decoder 420 via communication lines 425. This first signal decoder, possibly in combination with a digital-to-analog converter 335 or perhaps other decompression, mixing and/or encoding circuitry, converts the update data into a format recognized by the analog-input peripheral device 120. Alternatively, update data may be transferred to a second signal decoder 430 via communication line 435. This second signal decoder converts update data into a format recognized by the digital-input peripheral device 121.

Referring still to FIG. 4, CPU 440 controls all of the above mentioned processes. For the CPU 440 to control the above-mentioned processes, CPU 440 communicates with a plurality of elements through an internal high-speed bus 445. These elements may include, but are not limited or restricted to an optional internal volatile memory 450, at least one internal non-volatile memory element 455 (e.g., read only memory "ROM", erasable programmable read only memory "EPROM", electrically erasable programmable read only memory "EEPROM" and/or flash memory), and an extension bus interface 460.

CPU 440 also communicates with an external non-volatile memory element 340 (e.g., read only memory "ROM", flash memory, etc.) which is capable of containing a software program supporting a number of functions such as downloading or converting update data to a format recognized by peripherals, controlling the front-end unit, routing received video and audio data to appropriate data ports as well as many other functions.

CPU 440 also communicates with a transceiver device 345 (e.g., a modem), a remote command unit interface (RCU-IF) 350 and a transmitter controller 355. The CPU 440 communicates with the transmitter controller 355 through extension bus interface 460 and extension bus 320. The RCU-IF 350 receives commands from a remote control (not shown) and transfers these commands to CPU 440 via extension bus 320. The remote control may include one described in U.S. Pat. No. 5,453,758 assigned to Sony Corporation of Tokyo, Japan, as well as any other types of remote control.

Referring to FIGS. 1 and 3, transmitter controller 355 includes an Applied Specific Integrated Circuit (ASIC) to perform a number of operations. One operation involves transmission of signals to a peripheral device 130 via communication line 135 to indicate and/or control operations of at least one of the peripheral devices through a communication line such as IR or RF signaling. The peripheral device 130 may include a remote transmitter such as a SONY® VCR MOUSE™ manufactured by and commercially available from Matsushita of Osaka, Japan. Although not shown, remote transmitter includes processing circuitry (e.g., a micro-controller, processor or any combination of logic circuitry) to translate signals from IRD 110 into corresponding control signals recognized by a peripheral device such as an analog VCR.

Figure 5:
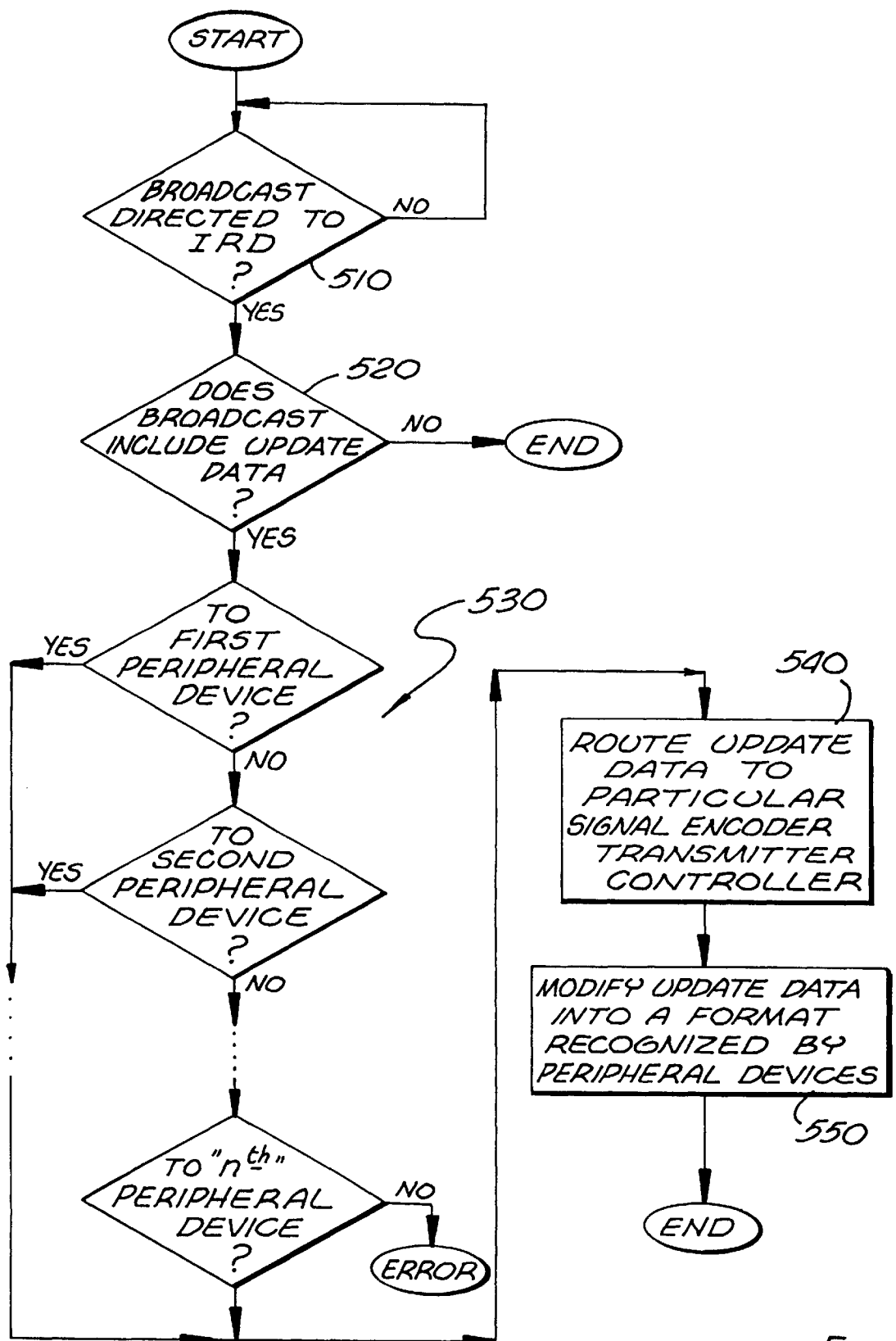
FIG. 5 is a flowchart illustrating operational steps performed by the IRD and its control circuitry.

Referring now to FIG. 5, a flowchart of the operational steps performed in loading update data into a peripheral device connected to IRD 110 is shown. Initially, the IRD determines whether a broadcast contains data directed to itself or a group of IRDs including itself (Step 510). Next, the IRD determines whether the broadcast includes update data (Step 520). This can be accomplished by checking the target ID field 210 in the header of the broadcast. If the broadcast includes update data, the IRD further analyzes the header to determine the peripheral destined to receive the update data (Step 530). This is accomplished by analyzing the contents of the peripheral ID field of the header.

Upon identifying the peripheral to receive the update data, the update data is routed to a particular signal encoding circuitry or perhaps a transmitter controller (Step 540). Thereafter, the update data is modified to a format recognized by the peripheral device (Step 550). For example, if the update data is routed to certain signal encoding circuitry, the update data is modified to a format recognized by the peripheral device connected to the signal encoding circuitry. If the update data is routed to the transmitter controller, the transmitter controller routes the update data to the remote transmitter, which in turn, modifies the update data into a format recognized by the peripheral device controlled by the remote transmitter.

The present invention described herein may be designed in many different embodiments and using many different configurations. As discussed herein, the architecture of the IRD is flexible to support multiple types of peripheral devices. While the present invention has been described in terms of various embodiments, other embodiments may come to mind to those skilled in the art without departing from the spirit and scope of the present invention. The invention should, therefore, be measured in terms of the claims which follow.

What is claimed is:

1. An entertainment system comprising:
   a first peripheral device; and
   a broadcast receiver coupled to the first peripheral device, the broadcast receiver configured to receive a broadcast signal, determine whether the broadcast signal includes update data destined for the first peripheral device, and load the update data into the first peripheral device, the broadcast signal including a plurality of data packets transporting the update data, each of the plurality of data packets including a target identification field identifying an integrated receiver decoder to process the update data, and a peripheral identification field indicating whether the first peripheral device is destined to receive the update data processed by the integrated receiver decoder.

2. The entertainment system of claim 1, wherein the first peripheral device includes an analog-input peripheral device.

3. The entertainment system of claim 1, wherein the first peripheral device includes a digital-input peripheral device.

4. The entertainment system of claim 1, wherein each of the plurality of data packets includes a header.

5. The entertainment system of claim 4, wherein each header includes the target identification field, the peripheral identification field and a size field.

6. The entertainment system of claim 1, wherein the target identification field further includes a sequence number indicating an ordering sequence of each data packet to support out-of-order transmission of the plurality of data packets.

7. The entertainment system of claim 1 further comprising at least one second peripheral device coupled to the integrated receiver decoder so that a plurality of peripheral devices are coupled to the integrated receiver decoder.

8. The entertainment system of claim 7, wherein the peripheral identification field identifies one of the plurality of peripheral devices targeted to receive the update data.

9. The entertainment system of claim 5, wherein the size field indicates a byte size of the update data.

10. An entertainment system comprising:
    a peripheral device; and
    a broadcast receiver coupled to the peripheral device, the broadcast receiver receiving a digital bit stream including a plurality of data packets each including a header portion and a content portion, the header portion including a target identification field indicating whether the digital bit stream is to be processed by the broadcast receiver, the header portion further including a peripheral identification field indicating whether the peripheral device is targeted to receive the update data.

11. The entertainment system of claim 10, wherein the broadcast receiver includes an integrated receiver decoder.

12. The entertainment system of claim 10, wherein the peripheral device includes an analog-input peripheral device.

13. The entertainment system of claim 10, wherein the peripheral device includes a digital-input peripheral device.

14. A method for loading update data into a peripheral device, the method comprising the steps of:

determining whether a plurality of data packets is targeted to a broadcast receiver; and determining whether the plurality of data packets include update data to be downloaded, wherein if so, examining a peripheral identification field to determine if the update data is to be downloaded to the peripheral device and modifying the update data into a format recognized by the peripheral device.

15. The method of claim 14, wherein determining whether the plurality of data packets is targeted to the broadcast receiver includes the step of accessing contents of a target identification field in a header of a first data packet of the plurality of data packets.

16. The method of claim 15, wherein determining whether the plurality of data packets includes update data includes the step of accessing contents of a sub-field of the target identification field to determine whether at least one predetermined bit is set to indicate that the update data is to be downloaded.

17. An entertainment system comprising:

a first peripheral device; and an integrated receiver decoder coupled to the first peripheral device, the integrated receiver decoder includes an antenna to receive a broadcast signal, and internal circuitry coupled to the antenna, the internal circuitry accesses a target identification field in a header information of the broadcast signal to determine whether the broadcast signal is directed to the integrated receiver decoder, the internal circuitry also determines from a peripheral identification field in the header information of the broadcast signal to determine whether the broadcast signal is targeted for the first peripheral device.

18. The entertainment system of claim 17, wherein the logic circuitry of the integrated receiver decoder further determines from the header information whether data of the broadcast signal is targeted for the first peripheral device.

19. An entertainment system comprising:

a first peripheral device; and an integrated receiver decoder (IRD) group including a plurality of IRDs coupled to the first peripheral device, each of the plurality of IRDs configured to receive a plurality of packets representing a broadcast signal, each of the plurality of IRDs also configured to examine a peripheral identification field in each of the plurality of packets to determine whether the broadcast signal is targeted for the first peripheral device.

20. The entertainment system of claim 17, wherein each of the plurality of IRDs included in the IRD group is further configured to examine a target identification field in each of the plurality of packets to determine whether the broadcast signal is intended to be processed by the plurality of IRDs included the IRD group.

21. The entertainment system of claim 20, wherein the plurality of IRDs included in the IRD group are located within one geographic location.

22. The entertainment system of claim 20, wherein the plurality of IRDs included in the IRD group are configured to support one particular digital satellite system (DSS) service package.

\* \* \* \* \*